US012627094B2

(12) United States Patent
Raftery et al.

(10) Patent No.: US 12,627,094 B2
(45) Date of Patent: May 12, 2026

(54) PEDESTAL ASSEMBLY FOR HOUSING CABLES

(71) Applicant: DBJ Innovations, LLC, East Canton, OH (US)

(72) Inventors: William B. Raftery, Canton, OH (US); Bryan Stark, East Canton, OH (US)

(73) Assignee: DBJ INNOVATIONS, LLC, East Canton, OH (US)

( * ) Notice: Subject to any disclaimer, the term of this patent is extended or adjusted under 35 U.S.C. 154(b) by 582 days.

(21) Appl. No.: 18/167,514

(22) Filed: Feb. 10, 2023

(65) Prior Publication Data

US 2024/0275104 A1 Aug. 15, 2024

(51) Int. Cl.
| | |
|---|---|
| *H01R 13/52* | (2006.01) |
| *H02B 1/50* | (2006.01) |
| *H02G 9/10* | (2006.01) |
| *H02G 3/04* | (2006.01) |

(52) U.S. Cl.
CPC ........... H01R 13/5213 (2013.01); H02B 1/50 (2013.01); H02G 9/10 (2013.01); *H02G 3/0493* (2013.01)

(58) Field of Classification Search
CPC .... H01R 13/5213; H02G 9/10; H02G 3/0493; G02B 6/4416; G02B 6/4477; G02B 6/4442; H02B 1/50
See application file for complete search history.

(56) References Cited

U.S. PATENT DOCUMENTS

| | | | | |
|---|---|---|---|---|
| D117,420 | S | 10/1939 | Walker | |
| D229,831 | S | 1/1974 | Sparling | |
| 3,864,510 | A * | 2/1975 | Ramsey, Jr. | ......... G02B 6/4451 174/38 |
| D235,555 | S | 6/1975 | Plummer | |
| 4,307,436 | A * | 12/1981 | Eckart | ...................... H02B 1/50 361/823 |
| 4,661,651 | A | 4/1987 | Leschinger | |
| 4,873,600 | A * | 10/1989 | Vogele | ..................... H02B 1/50 361/823 |
| 4,887,187 | A * | 12/1989 | Nickola | ................... H02B 1/50 361/826 |
| 4,901,202 | A | 2/1990 | Leschinger | |
| D322,425 | S | 12/1991 | Simonson | |
| 5,139,440 | A | 8/1992 | Volk et al. | |
| D372,897 | S | 8/1996 | Curry et al. | |
| 5,610,508 | A | 3/1997 | Kammiller | |
| 5,921,795 | A * | 7/1999 | Weener | ............... H02G 3/0493 174/497 |
| 5,923,548 | A | 7/1999 | Kammiller | |
| 6,104,921 | A | 8/2000 | Cosley et al. | |
| D430,849 | S | 9/2000 | Leschinger | |

(Continued)

*Primary Examiner* — Steven T Sawyer
(74) *Attorney, Agent, or Firm* — Sand, Sebolt & Wernow Co., LPA

(57) ABSTRACT
A data transmission pedestal assembly has an exterior terminal that permits an operator to use a cable locator device to connect with the exterior terminal and locate a cable within the pedestal while the pedestal remains assembled or without having to disassemble a cover from a base of the pedestal assembly. Within the pedestal is a cable mounting bracket that has distinct through holes to permit the passage of a cable between a front compartment and a rear compartment. The through holes are offset from a vertical center axis associated with the cable mounting bracket.

20 Claims, 12 Drawing Sheets

(56)　　　　　References Cited

U.S. PATENT DOCUMENTS

| | | | |
|---|---|---|---|
| 6,182,846 B1 | 2/2001 | Leschinger et al. | |
| 6,198,041 B1 | 3/2001 | Leschinger et al. | |
| 6,244,635 B1 | 6/2001 | Leschinger et al. | |
| 6,252,166 B1 | 6/2001 | Leschinger | |
| 6,291,986 B1 * | 9/2001 | Sorensen | G01R 11/04 |
| | | | 324/156 |
| 6,316,722 B1 | 11/2001 | Low et al. | |
| 6,455,772 B1 | 9/2002 | Leschinger et al. | |
| 6,462,269 B1 | 10/2002 | Leschinger et al. | |
| 6,501,015 B2 | 12/2002 | Maloney et al. | |
| D469,065 S | 1/2003 | Pawluk et al. | |
| 6,598,949 B2 | 7/2003 | Frazier et al. | |
| 6,672,893 B1 | 1/2004 | Sedlecky et al. | |
| 7,357,009 B2 | 4/2008 | Maloney et al. | |
| D589,456 S | 3/2009 | Puluc | |
| 7,569,768 B2 | 8/2009 | Maloney et al. | |
| 7,676,136 B2 | 3/2010 | Wakileh et al. | |
| 7,696,431 B2 | 4/2010 | Chen et al. | |
| 7,700,874 B2 | 4/2010 | Maloney et al. | |
| 7,728,224 B2 | 6/2010 | Maloney et al. | |
| 7,899,300 B2 | 3/2011 | Wakileh et al. | |
| 8,244,089 B2 | 8/2012 | Chen et al. | |
| 8,739,998 B2 | 6/2014 | Chen et al. | |
| D723,473 S | 3/2015 | Hagarty | |
| 9,155,221 B2 | 10/2015 | Dolan | |
| 9,297,186 B2 | 3/2016 | Chen et al. | |
| D776,060 S | 1/2017 | Haberkorn | |
| 9,604,392 B2 | 3/2017 | Chen et al. | |
| D826,034 S | 8/2018 | Feng | |
| 10,080,431 B2 | 9/2018 | Chen et al. | |
| D900,595 S | 11/2020 | Schmitz | |
| D917,399 S | 4/2021 | Yanase et al. | |
| 11,095,212 B2 | 8/2021 | Smith et al. | |
| D945,377 S | 3/2022 | Semple et al. | |
| D951,068 S | 5/2022 | Afragola | |
| D968,198 S | 11/2022 | Ruddick et al. | |
| D1,001,620 S | 10/2023 | Lin | |
| D1,002,623 S | 10/2023 | Keaton et al. | |
| 2002/0096346 A1 | 7/2002 | Maloney et al. | |
| 2002/0145367 A1 | 10/2002 | Frazier et al. | |
| 2005/0103067 A1 | 5/2005 | Maloney et al. | |
| 2007/0122100 A1 * | 5/2007 | Day | G02B 6/504 |
| | | | 385/134 |
| 2008/0115955 A1 * | 5/2008 | Gorin | H02G 3/085 |
| | | | 174/66 |
| 2008/0253105 A1 | 10/2008 | Maloney et al. | |
| 2008/0258020 A1 | 10/2008 | Chen et al. | |
| 2009/0050363 A1 | 2/2009 | Maloney et al. | |
| 2009/0050364 A1 | 2/2009 | Maloney et al. | |
| 2009/0238529 A1 | 9/2009 | Wakileh et al. | |
| 2009/0238530 A1 | 9/2009 | Wakileh et al. | |
| 2009/0324187 A1 | 12/2009 | Wakileh et al. | |
| 2010/0079041 A1 | 4/2010 | Chen et al. | |
| 2010/0142908 A1 | 6/2010 | Wakileh et al. | |
| 2010/0237757 A1 * | 9/2010 | Wakileh | H04Q 1/025 |
| | | | 312/294 |
| 2010/0239210 A1 | 9/2010 | Wakileh et al. | |
| 2010/0310226 A1 | 12/2010 | Wakileh et al. | |
| 2011/0058775 A1 | 3/2011 | Chen et al. | |
| 2011/0058785 A1 * | 3/2011 | Solheid | G02B 6/44526 |
| | | | 385/135 |
| 2011/0116239 A1 | 5/2011 | Chen et al. | |
| 2013/0082583 A1 | 4/2013 | Chen et al. | |
| 2014/0103579 A1 | 4/2014 | Chen et al. | |
| 2014/0225483 A1 | 8/2014 | Maloney | |
| 2014/0268566 A1 | 9/2014 | Dolan | |
| 2016/0025260 A1 | 1/2016 | Chen et al. | |
| 2018/0342844 A1 * | 11/2018 | Broere | B60L 53/16 |
| 2020/0083803 A1 | 3/2020 | Smith et al. | |
| 2020/0119537 A1 | 4/2020 | Heath et al. | |
| 2024/0266791 A1 * | 8/2024 | Moler | H01R 25/006 |

* cited by examiner

PEDESTAL ASSEMBLY FOR HOUSING CABLES

TECHNICAL FIELD

This disclosure is directed to data transmission pedestal assemblies for housing cables or other electrical components.

BACKGROUND

Data transmission lines connect central distribution offices to customer locations usually through buried underground cable. In close vicinity to a customer's location, the data transmission cable is brought above ground where preselected lines of the cable are connected to an underground service line from the customer, whose line is also brought above ground. The appropriate cable lines and service line are connected by the use of terminal blocks mounted to grounded frames. These above-ground connections are then covered by a pedestal to protect the electrical connections against weather and other environmental factors, as well as against tampering and vandalism. The pedestal may be opened to facilitate service of the lines and cable and to allow additional service lines to be connected to the cable.

The pedestal is designed to protect such equipment from the environment, as well as human interference. The pedestal is usually constructed as to be partially buried in the ground and to have a removable cover so that cable splices and terminations can be easily made such as on a structure known as a universal mounting plate.

It is common in cable routing and distribution systems to use ground wires and cables for bonding and grounding of electrical equipment. In telephone distribution systems, for example, a pedestal may be used for service drops wherein ground wires are used to prevent electrical interference. Also, where power distribution systems use pedestals, a ground rod may be driven next to the pedestal and connected to a ground terminal within the pedestal. In such cases, space considerations and internal structure of pedestal design are significant factors for convenience of electrical wire or cable termination and wire and cable routing within the pedestal.

An underground cable locator is a commonly used to locate underground fiber optic cable. A conventional underground cable locator consists of two parts—a transmitter and a receiver. The transmitter puts an electrical signal onto the cable or pipe being traced, while the receiver picks up the signal, allowing the locator operator to trace the signal's patch and follow the cable being located.

Locating or tracing buried cables is useful when it is needed to know the location or presence of a cable. However, since the cables are routed through the pedestal assembly, a serviceman must disassemble the pedestal before being able to connect the underground cable locator to locate or trace the cables housed within the pedestal.

SUMMARY

What is therefore needed is a device that allows a service technician to identified the fiber optic cables within the pedestal without having to disassemble the pedestal. The present disclosure addresses this issue and other issues by providing an improved communications pedestal having an exterior terminal that facilitates a connection with a locator device to permit a service line operator to locate a cable within pedestal without having to disassemble the pedestal (i.e., while the pedestal remains assembled with the cover attached to the base). Additionally, the pedestal has a mounting bracket including distinct and offset through holes that maintain cables in a desired location relative to the mounting bracket.

In one aspect, an exemplary embodiment of the present disclosure may provide a data transmission pedestal assembly comprising: a cover including at least one sidewall that defines a portion of an interior space for retaining cables therein; a base configured to connect with the cover, the base including at least one sidewall; a cable mounting bracket located within the interior space of the cover; a grounding bracket located within the interior space, wherein at least one of the cables coupled to the grounding bracket; and an exterior terminal in communication with the grounding bracket, wherein the exterior terminal is adapted to connect with a cable locator device that determines which cables are contained within the interior space of the data transmission pedestal assembly while the data transmission pedestal assembly remains assembled with the cover connected to the base.

This exemplary embodiment or another exemplary embodiment may further include a parting line established at a union of the cover with the base, wherein the exterior terminal is located below the parting line.

This exemplary embodiment or another exemplary embodiment may further include a frontal wall of the base, wherein the exterior terminal is located on the frontal wall of the base. This exemplary embodiment or another exemplary embodiment may further include a ground indicator line on the frontal wall of the base, wherein the exterior terminal is located on the frontal wall of the base above the ground indicator line.

This exemplary embodiment or another exemplary embodiment may further include a frontal wall of the base, wherein the frontal wall defines an aperture to pass cables through the aperture into the interior space. This exemplary embodiment or another exemplary embodiment may further include a gasket in the aperture defined in the frontal wall of the base. This exemplary embodiment or another exemplary embodiment may further include a vertical slit in the gasket to permit passage through the gasket. This exemplary embodiment or another exemplary embodiment may further include a horizontal slit in the gasket that extends from the vertical slit.

This exemplary embodiment or another exemplary embodiment may further include a vertical center axis; wherein the cable mounting bracket defines the interior space into a front compartment and a rear compartment; and at least one through hole formed in the cable mounting bracket to permit passage of the cable between the front compartment and the rear compartment, wherein the at least one through hole is offset from the vertical center axis. This exemplary embodiment or another exemplary embodiment may further include four through holes formed in the cable mounting bracket, wherein the at least one through hole is one of the four through holes. This exemplary embodiment or another exemplary embodiment may further include a first through hole; a second through hole; a third through hole; and a fourth through hole; wherein the first and second through holes are located above the third and fourth through holes. This exemplary embodiment or another exemplary embodiment may further include an upper first loop support located along the vertical center axis between the first and second through holes; and a lower second loop support located along the vertical center axis between the third and fourth through holes. This exemplary embodiment or another exemplary embodiment may further include a rectangular configuration of the at least one through hole, wherein a vertical length dimension of the at least one through hole is greater than a horizontal width dimension of the at least one through hole.

This exemplary embodiment or another exemplary embodiment may further include a frontal wall of the cover; and a first handle on the frontal wall of the cover. This exemplary embodiment or another exemplary embodiment may further include that the first handle is integrally formed in the frontal wall of the cover adjacent a top surface of the cover. This exemplary embodiment or another exemplary embodiment may further include a rear wall of the cover; and a second handle on the frontal wall of the cover. This exemplary embodiment or another exemplary embodiment may further include that the second handle is integrally formed in the rear wall of the cover adjacent a top surface of the cover.

In yet another aspect, another exemplary embodiment of the present disclosure may provide a method of use for a data transmission pedestal assembly comprising: approaching a data transmission pedestal assembly comprising: a cover including at least one sidewall that defines a portion of an interior space for retaining cables therein; a base connected with the cover, the base including at least one sidewall; a cable mounting bracket located within the interior space of the cover; a grounding bracket within the interior space, wherein at least one of the cables coupled to the grounding bracket; and an exterior terminal in communication with the grounding bracket; connecting with a cable locator device to the exterior terminal while the data transmission pedestal assembly remains assembled with the cover connected to the base; locating, with the cable locator, a cable within the assembled pedestal assembly while the data transmission pedestal assembly remains assembled with the cover connected to the base.

This exemplary method or another exemplary method may further include locating at least one cable that extends through a rectangular through hole in the cable mounting bracket, wherein the rectangular through hole is offset from a vertical center axis and has a vertical length dimension that is greater than a horizontal width dimension. This exemplary method or another exemplary method may further include removing the cover from the base after having located the cable, wherein removing the cover from the base is accomplished by lifting the cover with a handle integrally formed in the at least one sidewall of the cover.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
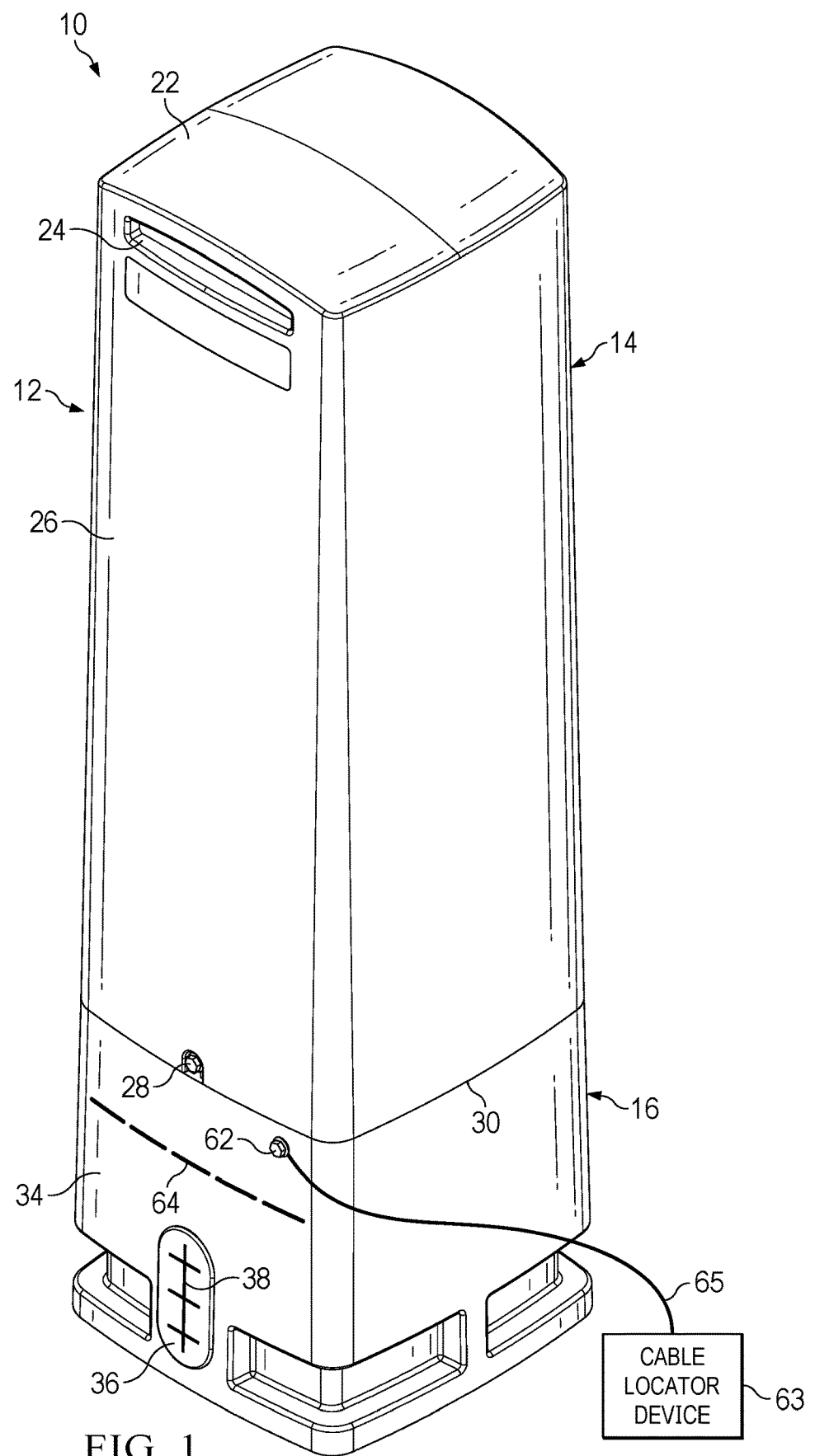
FIG. 1 is a top perspective view of an assembled pedestal assembly according to an exemplary embodiment of the present disclosure.
Figure 2:
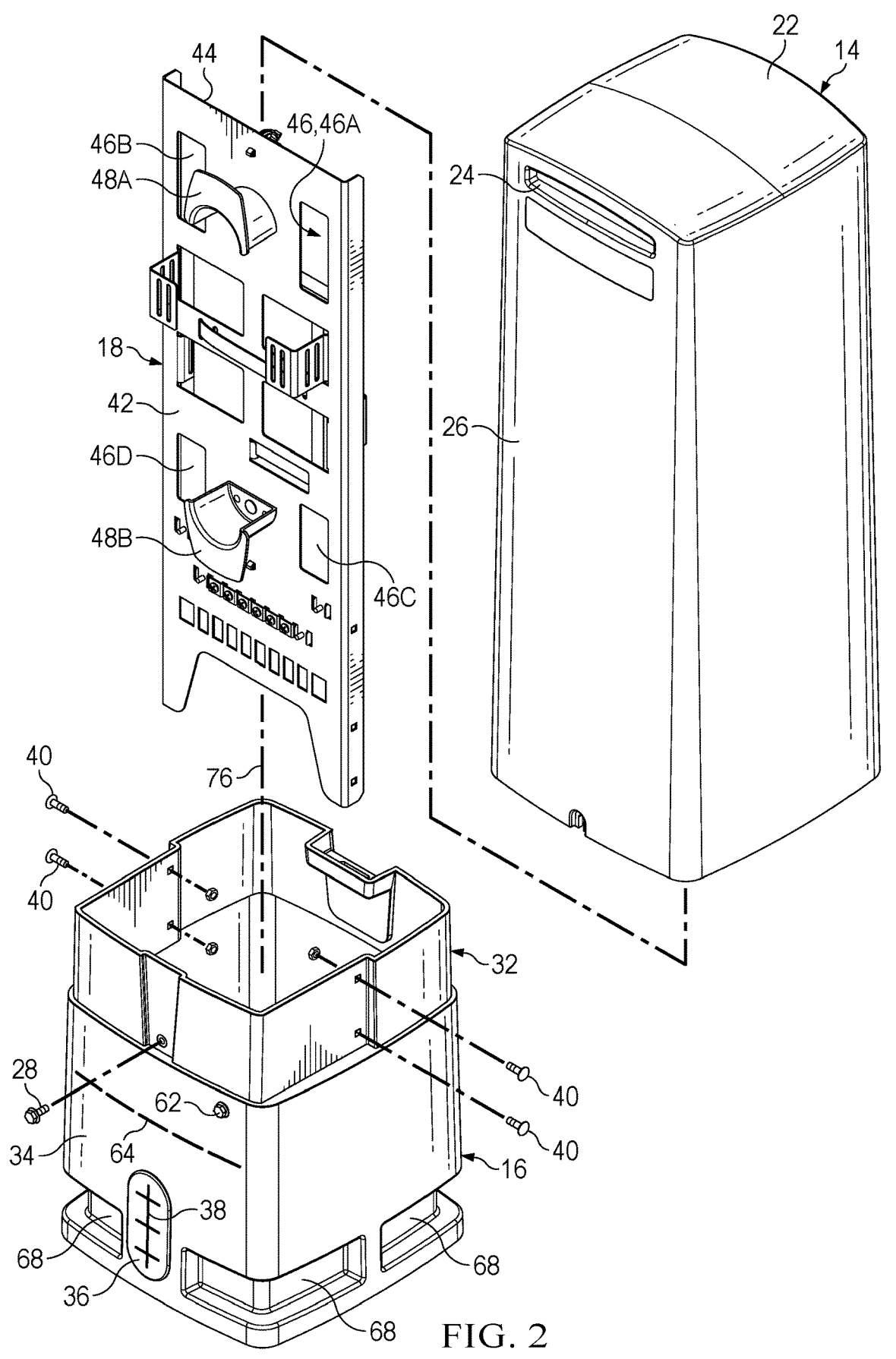
FIG. 2 is an exploded top perspective view of the pedestal assembly.
Figure 8:
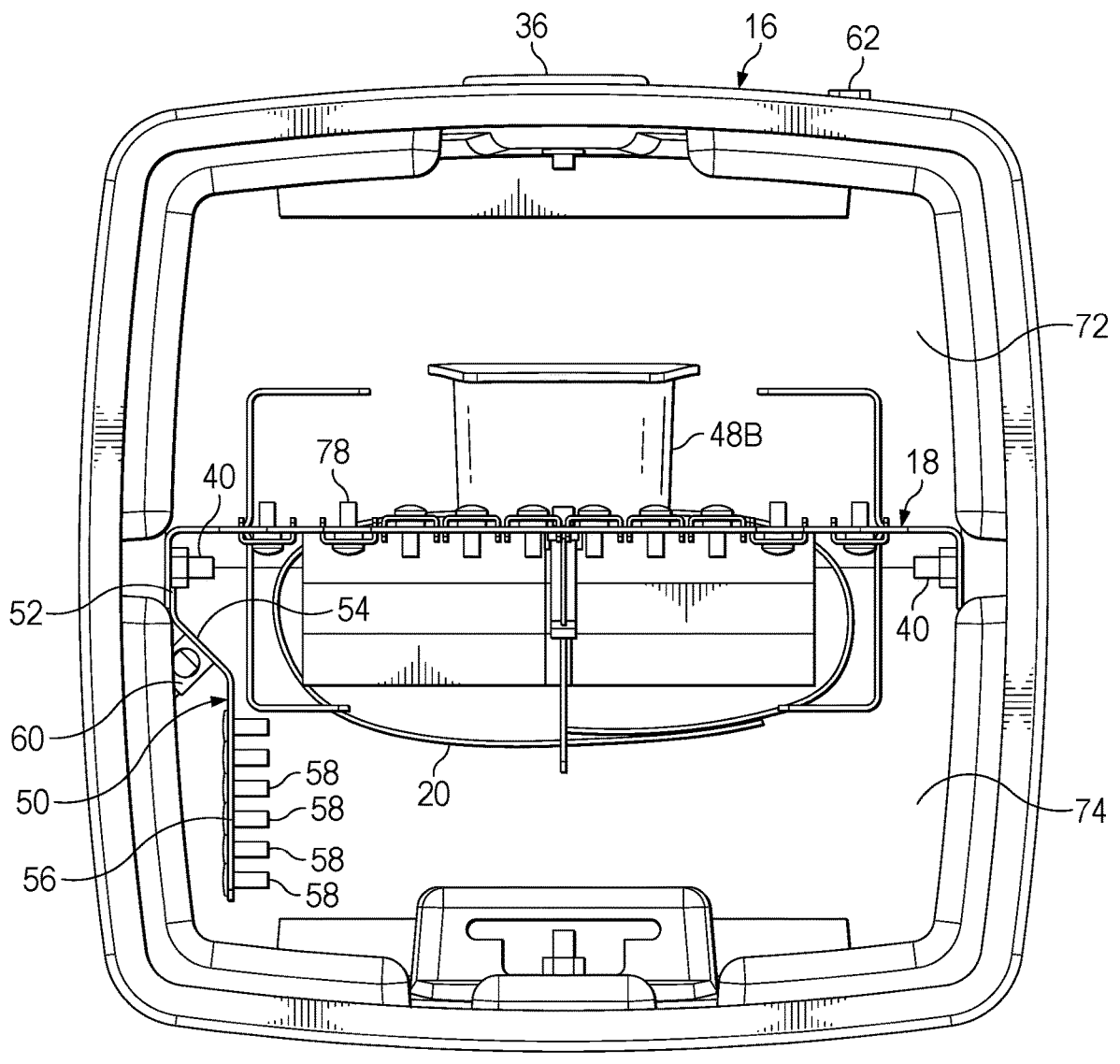
FIG. 8 is a bottom plan view of the pedestal assembly.
Figure 9:
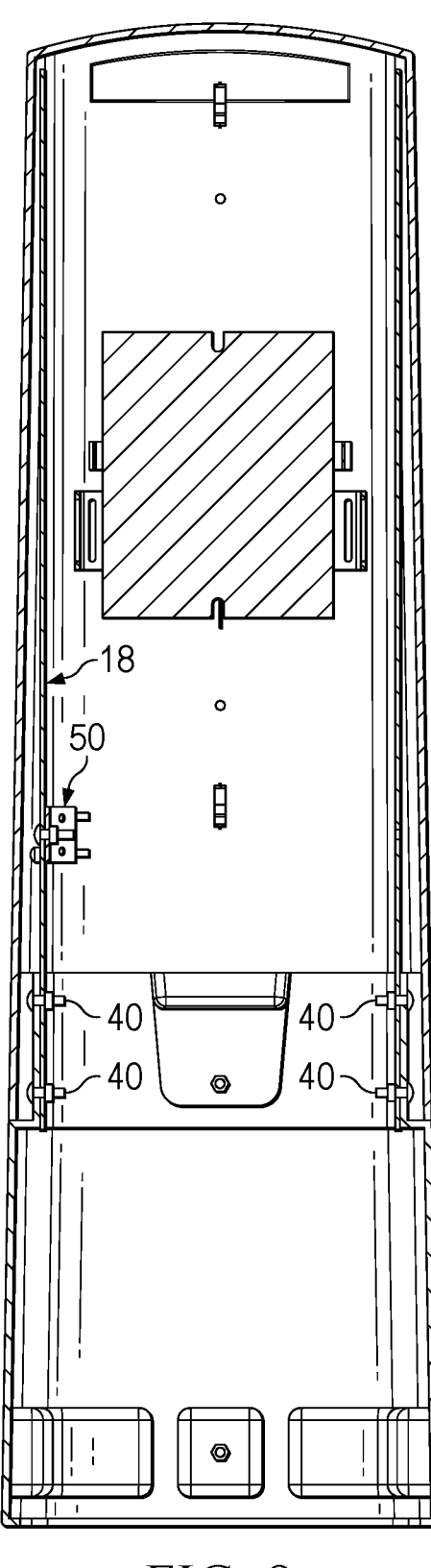
FIG. 9 is a cross section view taken along line 9-9 in FIG. 5.
Figure 10:
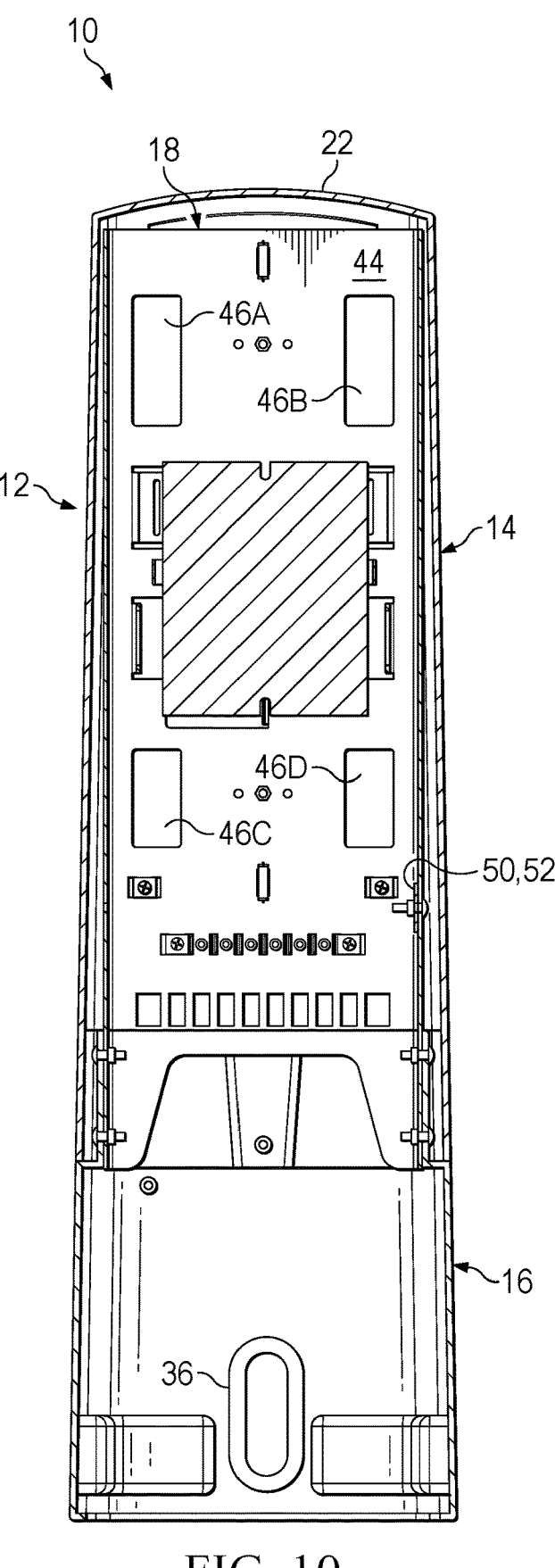
FIG. 10 is a cross section view taken along line 10 in FIG. 5.
Figure 11:
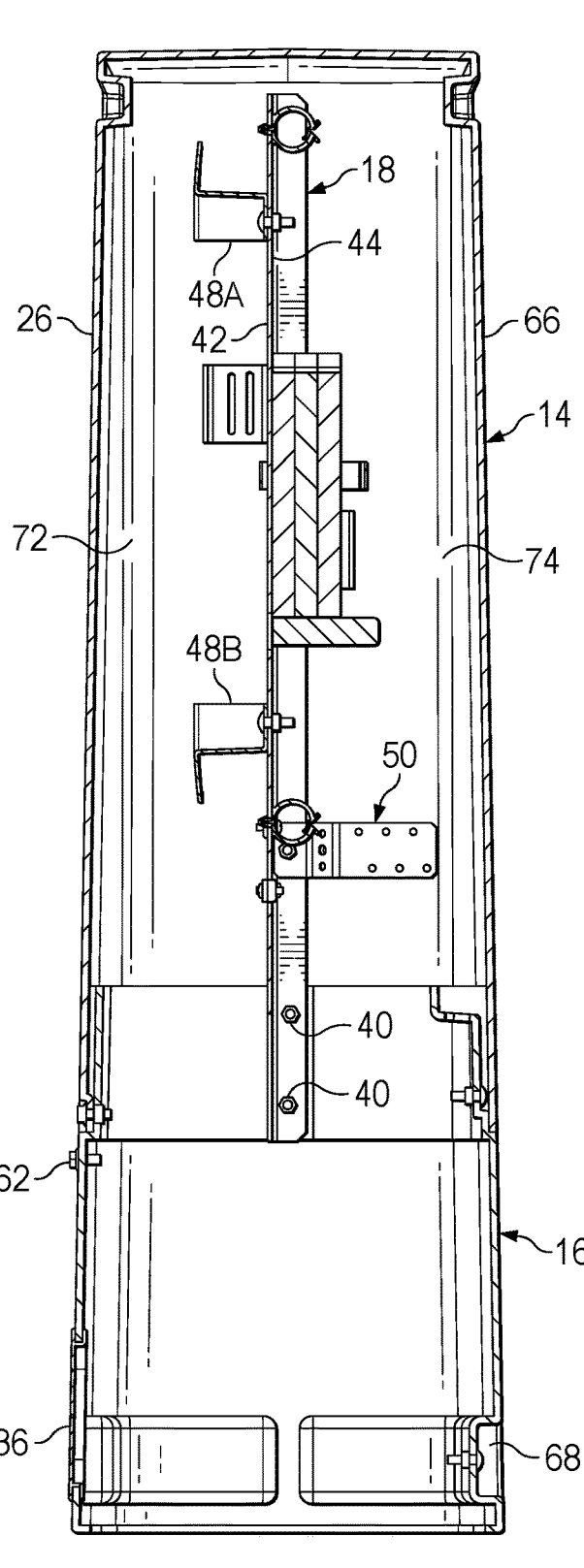
FIG. 11 is a cross section view taken along line 11-11 in FIG. 3.
Figure 12:
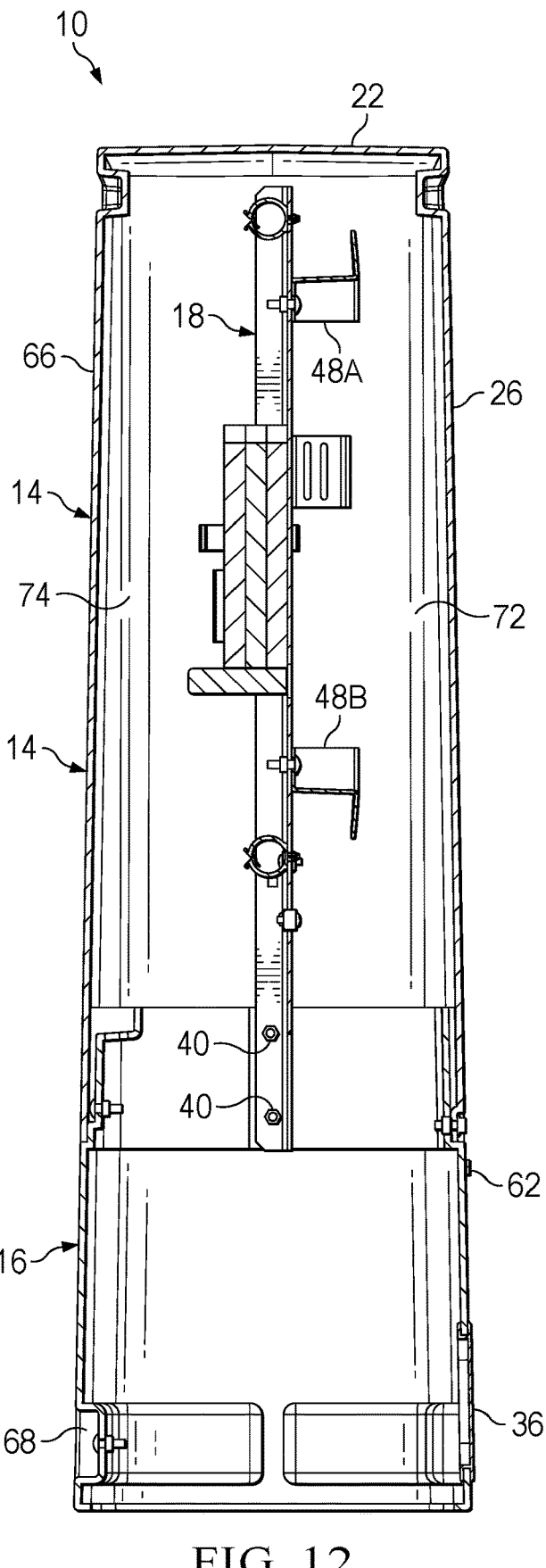
FIG. 12 is a cross section view taken along line 12-12 in FIG. 3.

FIG. 1 and FIG. 2 depict a data transmission, fiber optic, or other cable pedestal assembly is shown generally throughout the figures at 10 and may be referred to for brevity as pedestal 10. Pedestal 10 includes a housing 12 comprising a cover 14 and a base 16. Cover 14, which may be also referred to as cover section 14, is configured to releasably mate or nest with the base 16, which may also be referred to as base section 16. The cover 14 and the base 16 have a substantially rectangular configuration. Alternatively, the cover 14 and base 16 may have a different shape. The cover 14 is sized to fit over a cable mounting bracket 18 within the interior of the cover 14. The cover 14 also fits over and is supported by a portion of the base 16. The cover 14 provides cover, protection and weather proofing for the cable mounting bracket 18 and items mounted upon the cable mounting bracket 18, such as cables 20 (FIG. 8). This combination provides physical and weather protection for the cable 20, wire, connections and other elements contained on or within the cable mounting bracket 18.

Cover 14 may be formed from an unibody material. Cover 14 may be a unibody that is integrally extruded, molded, printed, or additively manufactured, removably machined, or formed as a unitary, monolithic member substantially fabricated from a rigid or substantially-rigid, manmade, material. In one example, hardened polymers, may form a substantial majority of the components or elements used to fabricate the cover 14 and the various components integrally formed, molded, or extruded therewith. The cover 14 should withstand typical electrician/service line handling from an operator manipulating the cover 14 without damaging cover 14. While it is contemplated that the cover 14 and its additional components described herein are uniformly and integrally extruded, molded, or formed, it is entirely possible that the components of the cover 14 be formed separately from alternative materials as one having routine skill in the art would understand. Furthermore, while the components of the cover 14 are discussed below individually, it is to be clearly understood that the components and their corresponding reference elements of the cover 14 are portions, regions, or surfaces of the body and all form a respective element or component of the unitary cover 14. Thus, while the components may be discussed individually and identified relative to other elements or components of the cover 14, in this exemplary embodiment, there is a single cover 14 having the below described portions, regions, or surfaces.

Cover 14 includes a plurality of sidewalls and a top that are integrally formed together and define an interior space configured to receive components therein, such as, the mounting bracket 18 that is sized and configured to receive, retain, and support various cables 20. Cover 14 may include four sidewalls that extend down from the enclosed top down to a lower edge defining an opening to the interior of the cover 14. Adjacent the top surface 22, there is a handle 24 that is formed within at least one of the sidewalls of the cover 14. For example, handle 24 may be formed in a frontal sidewall 26 near the top thereof that will allow an operator to grasp the cover 14 and remove it from the base 16 when a connector or screw 28 is removed, wherein the screw or connector 28 extends through both the cover 14 and the base 16 to secure them together in a closed or assembled position.

Base 16 may be formed from an unibody material. Base 16 may be a unibody that is integrally extruded, molded, printed, or additively manufactured, removably machined, or formed as a unitary, monolithic member substantially fabricated from a rigid or substantially-rigid, manmade, material. In one example, hardened polymers, may form a substantial majority of the components or elements used to fabricate the base 16 and the various components integrally formed, molded, or extruded therewith. The base 16 should withstand typical electrician/service line handling from an operator manipulating the base 16 without damaging base 16. While it is contemplated that the tool body and its additional components described herein are uniformly and integrally extruded, molded, or formed, it is entirely possible that the components of the base 16 be formed separately from alternative materials as one having routine skill in the art would understand. Furthermore, while the components of the base 16 are discussed below individually, it is to be clearly understood that the components and their corresponding reference elements of the tool body are portions, regions, or surfaces of the base 16 and all form a respective element or component of the unitary base 16. Thus, while the components may be discussed individually and identified relative to other elements or components of the base 16, in this exemplary embodiment, there is a single base 16 having the below described portions, regions, or surfaces.

Base 16 includes four sidewalls that are complementary to the sidewalls of the cover 14. The sidewalls of base 16 are of a similar shape and configuration that allow a smooth transition across a parting line 30 when the cover 14 is installed on the base 16 and secured by screw 28. The base 16 may also include and upper extending portion 32 that is configured to be received with in the cover 14. The upper extending portion 32 may be formed of a continuous or a plurality of sidewalls connected together that received the screw 28 therethrough when the cover 14 is nested upon the base 16. Base 16 further includes a frontal wall 34 having an opening formed therethrough that is selectively accessible through a gasket or grommet 36. The gasket or grommet 36 defines a slot or slit 38 for cables to be passed through the opening of the frontal wall 34. Gasket 36 may be formed from a flexible polymer material to allow cables to pass through the slit 38 but also seal the aperture from the surrounding or exterior environment. The lower end of the base 16 also defines an opening which would allow cables to be passed through the lower opening of the base 16 into the interior space on the pedestal 10, if desired. As such, the cables may be passed through either the bottom of the base 16 or through the opening selectively sealed by gasket 36 on the frontal wall 34. The cables 20 are then routed or passed vertically upward into the interior space of pedestal 10 and selectively retained or supported by bracket 18.

Bracket 18 is a generally flat or planar rigid member having side edges or short side walls that connect to the base 16 via connectors 40. The bracket 18 includes a frontal surface 42 and a rear surface 44. The bracket 18 divides the interior space of pedestal 10, when fully assembled, into a front compartment 72 and a rear compartment 74.

Bracket 18 includes a plurality of through holes 46 that extends through the bracket from the frontal surface 42 to the rear surface 44 to allow cables to be passed through the bracket between the front compartment and the rear compartment of pedestal 10. In one particular embodiment, there are at least four through holes in bracket 18. Namely, a first through hole 46A, a second through hole 46B, a third through hole 46C, and a fourth through hole 46D. The first through hole 46A and the second through hole 46B are positioned vertically above the third through hole 46C and the fourth through hole 46D. The first and second through holes 46A, 46B may be offset on opposite sides of an upper loop support 48A, and the third and fourth through holes 46C, 46D may be positioned on opposite sides of a lower loop support 48B. In one specific embodiment, each through hole, 46A, 46B, 46C, and 46D is rectangular in configuration and defined by two vertical edges and two horizontal edges that meet at right angles that define the opening that extends fully through the bracket 18 from the frontal surface 42 to the rear surface 44. It has been determined that the rectangular configuration of the through holes optimizes a pass through feature for the cables 20 between the front compartment 72 and the rear compartment 74 while also maintaining the cables in a desired pass through location to prevent the cables from moving too far horizontally or too far vertically from the respective loop supports 48A, 48B. For example, if a single through hole is utilized that is an inverted u-shaped configuration that would extend over the loop support 48A, there would be a tendency for the cables to translate or slide in the horizontal direction that may permit undesired movement or shifting of the cables once the pedestal assembly 10 is fully assembled and installed.

Bracket 18 may also include a plurality of fastener standoffs. The fastener standoffs are used for attaching the cables 20 or distribution component(s) to one side of the mounting plate without the attachment mechanically interfering with cables 20 or distribution component(s) on the second side of the bracket 18. The standoff disposes the cables 20 or distribution component(s) offset from the surface of the bracket 18 to create a clearance so that screws or bolts can be used to attach items to the other side of the plate. Cables 20 or distribution component(s) may, therefore, be mounted in the same horizontal and vertical position on the mounting plate on each side of the mounting plate. Because of the standoffs, there is no need to adjust the position of cables 20 or distribution component(s) on one side of the bracket 18 to avoid interfering with mounting locations for cables 20 or distribution component(s) on the second side of the mounting plate. Although the figures illustrate a plurality of fastener standoffs, the cable mounting structure may have more or less, or even no, fastener standoffs. The fastener standoffs may also be separate parts attached to the mounting plate or a unitary part of the mounting plate. The standoffs may be molded into the mounting plate as part of the mounting plate when the mounting plate is formed.

Bracket 18 may be adapted to support a plurality of cables 20 or distribution component(s) in different numbers and combinations. The cables 20 or distribution component(s) may be for copper wire or fiber optic cable. The cables 20 or distribution component(s) are available from a number of different manufacturers and in a variety of configurations. The bracket 18 is adapted to mount the components from any manufacturer in any combination. Copper wire and fiber optic cable distribution components may be mixed in the cable mounting bracket 18, either in the same compartment or copper in one compartment and fiber optic cable in the other compartment. The distribution components may include, without limitation, cable management guides, ground wire posts, strength member clamps, splice trays, splice tray support brackets, radius limiting spools, support plates for non-hardened connections, hardened connector blocks, copper blocks, hardened and non-hardened pre-connectorized fiber cable connections.

A grounding bracket 50 is connected with bracket 18. The grounding bracket can be a stamped and formed sheet metal member having a unitary structure. Machine screws with washers may be conveniently threaded into the grounding bracket 50 for purposes of a floating bond. Also, one or more service wire clamps may be threaded into the grounding bracket 50. Grounding bracket 50 may be constructed according to the present disclosure not only offers versatility in grounding both telecommunications and power cables and equipment in pedestal enclosures, its specific construction provides for a high degree of convenience in making grounding connections and routing cables within a pedestal. For example, if desired, cables or wires may be routed to the grounding bracket 50 where they can be terminated to the grounding bracket 50 so as to be out of the way of other cables or run behind the bracket to be connected to upper terminal blocks. Moreover, the grounding bracket 50 serves as a single point ground member, in addition to a cable locator as explained in greater detail below with respect to exterior terminal 62, which makes location of cables and wires a more convenient arrangement over prior art grounding systems currently used in pedestal construction.

In one particular embodiment, grounding bracket 50 is a unitary metal structure comprising a generally elongated S-shaped configuration having a first planar section 52, an angled or slanted center second section 54, and a planar third section 56. The first section 52 and the third section 56 are flat portions that are offset parallel to one another. In one particular embodiment, the offset distance of the parallel alignment of the first section 52 and the third section 56 of grounding bracket 50 is in a range from about ¼ inch to about 1 inch. The center angled second section 54 is located between the first section 52 and the third section 56 and defines the offset distance. The third section 56 includes a plurality of grounding connections or terminals 58 that are configured to connect with the wires or cables within the interior volume of pedestal 10. Additionally, grounding bracket 50 includes a master terminal 60 that is in electrical communication with an exterior terminal 62. The exterior terminal 62 may be connected to the grounding bracket 50 at the master terminal 60 via a wire (not shown). Alternatively, the exterior terminal may be electrically connected to grounding bracket 50 at another location. The exterior terminal 62 extends through at least one of the sidewalls of base 16. In one particular embodiment, the exterior terminal 62 is located on the frontal wall 34 of base 16 and is disposed below the parting line 30 and located above a ground line indicator 64. Although the exterior terminal 62 is shown in the frontal wall 34, it may be located in any of the sidewalls of base 16. Regardless of which sidewall the exterior terminal 62 is located, it is envisioned that the exterior terminal 62 is located below the parting line 30 so as to allow a service line operator to connect their locator with the exterior terminal 62 when the pedestal 10 is fully assembled with the cover 14 secured to the base 16. However, it is entirely possible for the exterior terminal to be located on the cover 14 and still provide the location functionality, described below, of the exterior terminal 62.

One exemplary advantage of providing the exterior terminal 62 on the outside of the housing 12, namely, on the exterior surface of base 16, is that it allows the service line operator to connect their cable locator device to the terminal 62 to determine which cables are contained within the interior of the pedestal 10 without having to disassemble the cover 14 from the base 16. This is advantageous inasmuch as the exterior terminal 62 is in electrical communication with the master terminal 60 via a wire, which is in electrical communication with terminals 58 via the conductive grounding bracket 50. This feature provides an improvement over previous pedestals that would require a pedestal to be disassembled for a service line operator to determine which cables were within the pedestal. Now, with the inclusion of the exterior terminal 62, a service line operator can quickly connect their locator device to the exterior terminal 62 to determine which cables are within the pedestal 10 without needing to disassemble pedestal 10. Further, while the grounding bracket 50 is shown as having the configuration herein, the shape of the grounding bracket may differ and still take advantage of the features of an exterior terminal 62 in electrical communication with a grounding bracket so that an operator can connect their locator device to the grounding bracket to determine which cables are located within pedestal 10. For example, a grounding bracket such as the one shown is U.S. Pat. No. 6,252,166 has a different configuration than which is shown herein, however, that grounding bracket could be utilized and provided with and exterior terminal in electrical communication with the same to allow an operator to determine what cables are within the pedestal without needing to disassemble the pedestal 10. Thus, exterior terminal 62 may be considered a "locate lug" to allow a signal to be sent from the locator device through the exterior terminal 62 and into the interior components of pedestal 10 so that the locator device may identify and determine, and therefore locate, which cables are within pedestal 10 without having to disassemble pedestal 10. For example, some commercially available underground cable locator devices that would operate in conjunction with exterior terminal 62 are available for sale by Amprobe, such as the Amprobe AT-6010; AT-6020; AT-6030; UAT-610; UAT-620; AT-8020; or AT-8030, all of which are incorporated herein by reference as if fully re-written.

As such, an operation of pedestal 10 includes approaching the data transmission pedestal 10. Then, connecting a cable locator device 63, such as those described above, to the exterior terminal 62 via a wire 65 while the data transmission pedestal assembly remains assembled with the cover connected to the base (i.e., without the need for disassembling pedestal 10). Then, locating, with the cable locator 63, a cable 20 within the assembled pedestal 10 assembly while the data transmission pedestal 10 assembly remains assembled with the cover 14 connected to the base 16.

Figure 3:
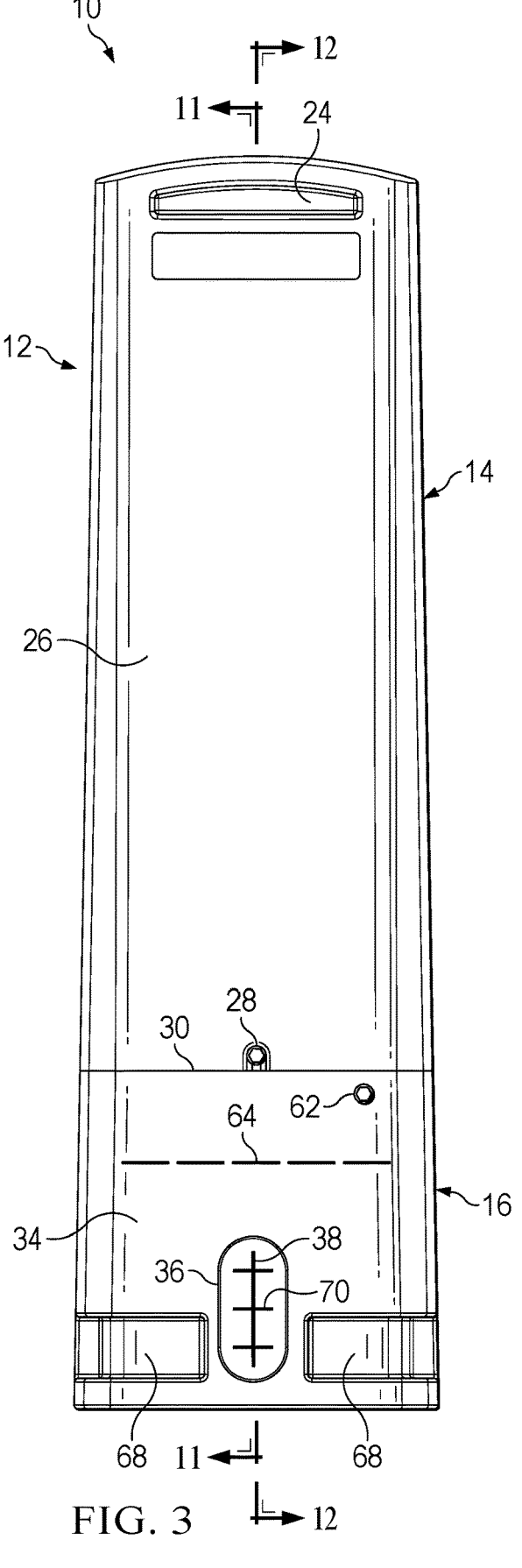
FIG. 3 is a front elevation view of the pedestal assembly.
Figure 4:
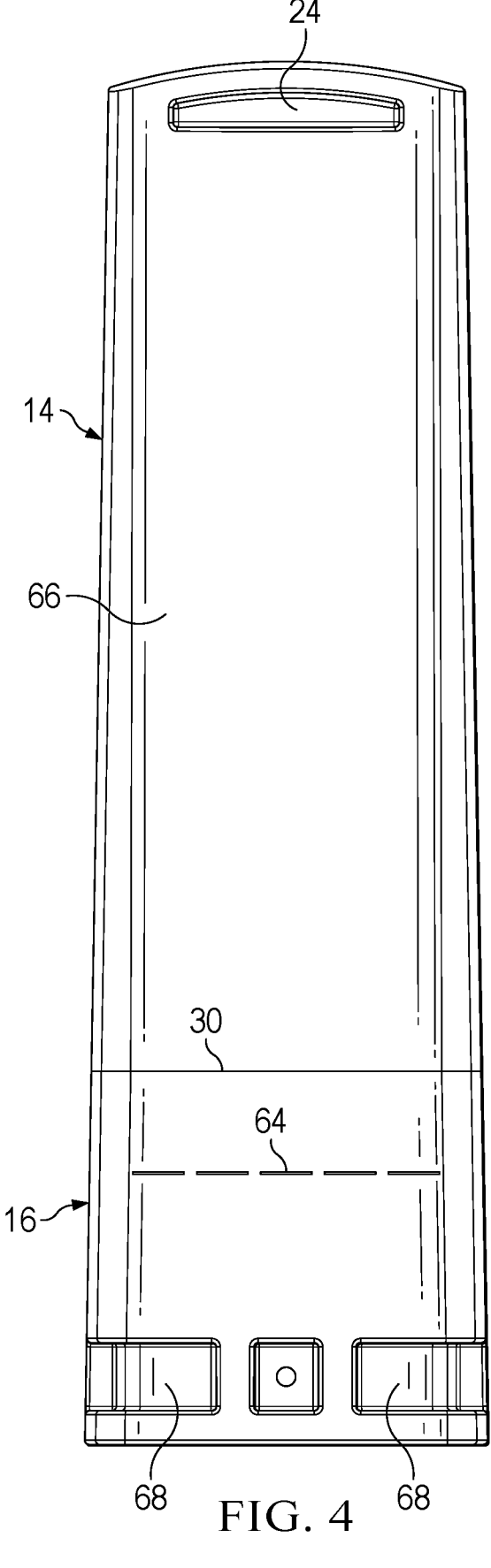
FIG. 4 is a rear elevation view of the pedestal assembly.

FIG. 3 and FIG. 4 depict that handle 24 may be formed in the frontal sidewall 26. Additionally, another handle 24 may be formed in the rear sidewall 66. As shown herein, there may be two handles 24, wherein one handle formed in the frontal sidewall 26 and one handle 24 formed in the rear sidewall 66. Each handle 24 is generally formed as a horizontally oriented channel bound by first and second ends that terminate short of the first and second sidewalls of cover 14. Each handle 24 may be located slightly below the top surface 22 of cover 14. The handle 24 may have a depth that is in a range from about ¼ inch to about 1 inch. The handle 24 may be disposed below the top surface 22 that is a range from about 1 inch below the top surface 22 to about 3 inches below the top surface 22. Further, while the handle 24 is envisioned to be integrally formed with the sidewalls of cover 14 it is entirely possible for a handle to be utilized that is an attachment to one of the sidewalls, such as frontal sidewall 26 or rear sidewall 66. Alternatively, the handles could be formed in one of the other sidewalls of cover 14 such that a handle on the sidewalls takes the configuration of an integrally formed channel or a separate component connect to one of the sidewalls.

Figure 5:
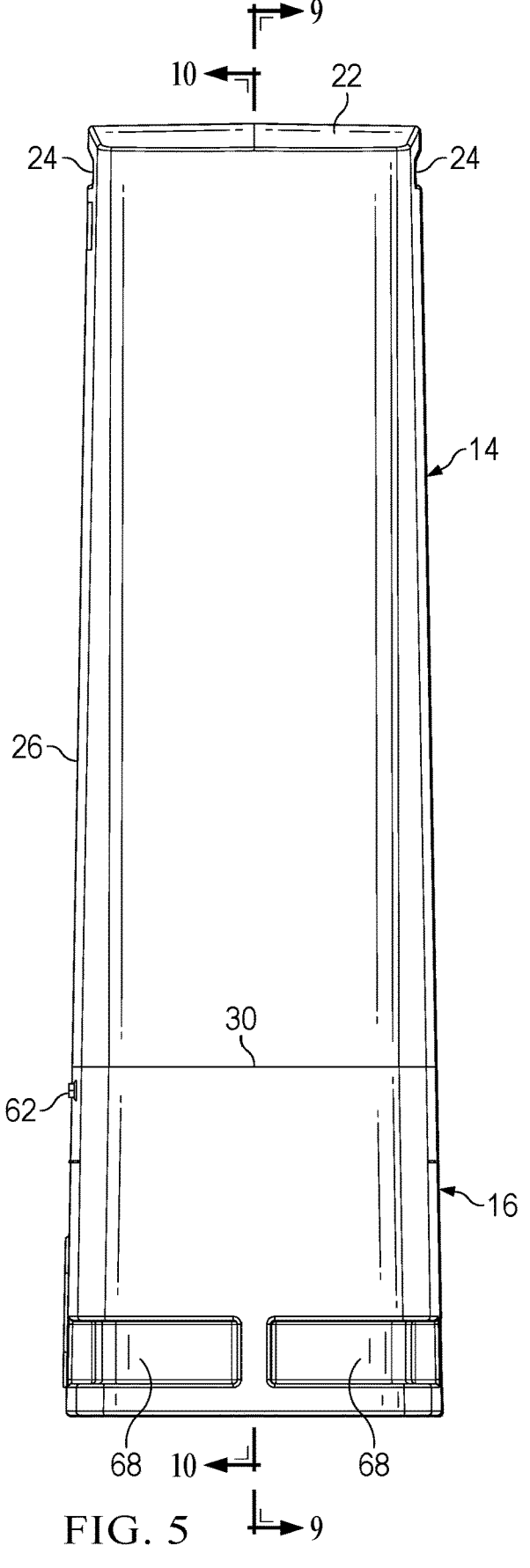
FIG. 5 is a first side elevation view of the pedestal assembly.
Figure 6:
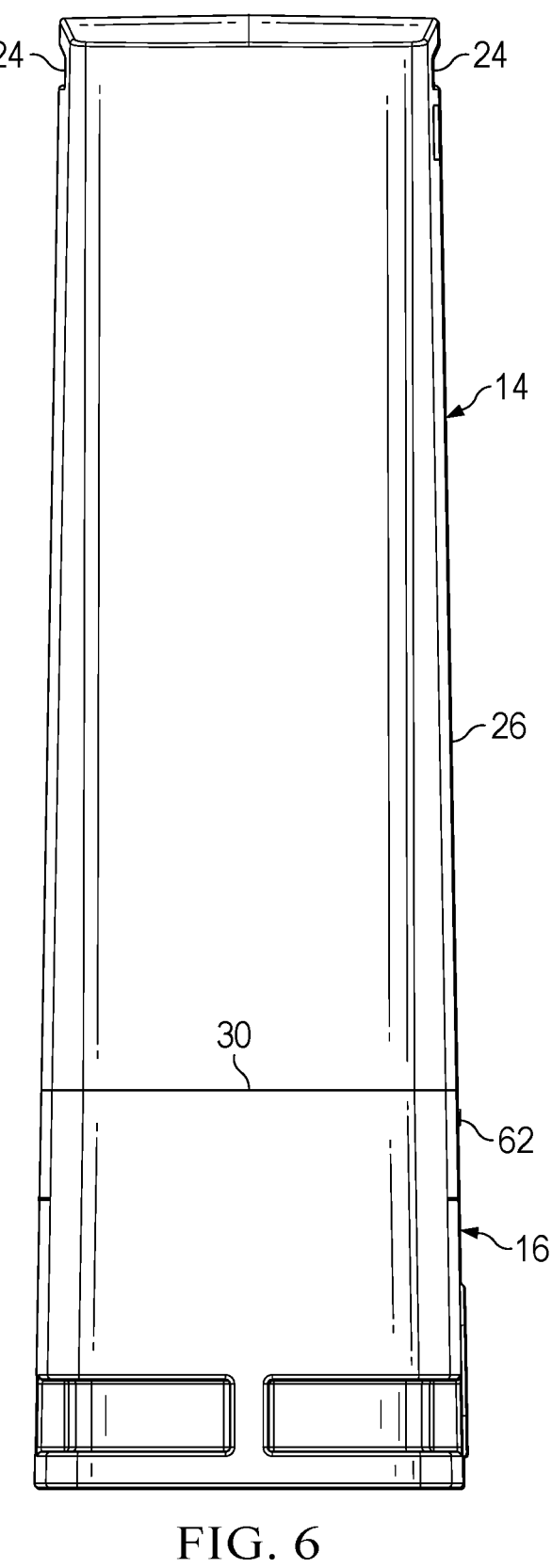
FIG. 6 is a second side elevation view of the pedestal assembly.
Figure 7:
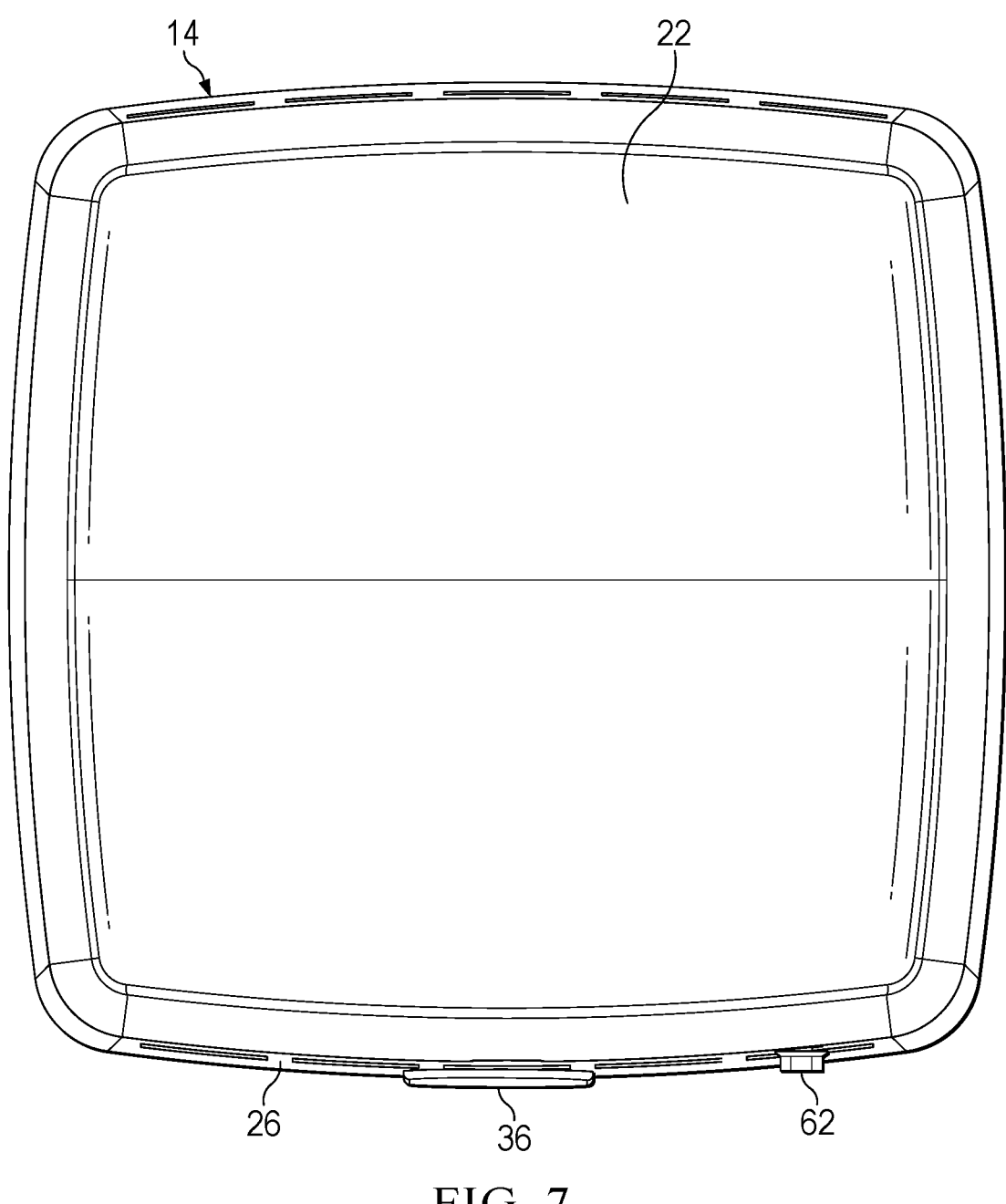
FIG. 7 is a top plan view of the pedestal assembly.

With continued reference to FIG. 3 and FIG. 4, in addition to FIG. 5 and FIG. 6, the base 16 includes four L-shaped channels that span each respective corner of base 16. Each channel 68 has a first leg that is formed in one sidewall of base 16 and a second leg that is formed in another sidewall of base 16 that is generally orthogonal to that of the first leg of channel 68. Thus, the channel 68 has its first leg and its second leg that meet at the corner defined by two or more orthogonal sidewalls of base 16. Each channel 68 is located slightly above the bottom of base 16. In one particular embodiment, each channel 68 is located approximately 1 inch above the bottom of base 16. With respect to the frontal sidewall 34 of base 16, the grommet or gasket 36 is located between the terminal end of a second leg of one channel 68 and the terminal end of a first leg of an adjacent channel 68. The grommet or gasket 36 is located in the space between these two terminal ends of adjacent channels 68 and extends vertically upward in an oval configuration such that the upper end of the gasket 36 is located above the upper edge of each channel 68. The slot 38 within gasket 36 is a vertically oriented slit 38 that may have horizontal sub-slots 70 to facilitate easier passage of cables through gasket 36.

FIG. 8 depicts the bracket 18 installed within pedestal 10 that divides the interior space of pedestal 10 into the front compartment 72 and the rear compartment 74. The cables 20 are able to be wrapped around the bracket 18 by passing them through the through holes 46 between the front compartment 72 and the rear compartment 74. As indicated previously, the distinct locations of the through holes 46 being located on opposite sides of the loop supports 48A, 48B ensures that cables 20 are retained in their desired position without sliding across a vertical center line axis 76. Stated otherwise, each distinct through hole 46A, 46B, 46C, and 46D is offset and spaced apart and distinct from the vertical axis 76 and does not intersect the vertical axis 76. The vertical length of each through hole 46A, 46B, 46C, and 46D is greater than the horizontal width of each through hole. This allows cables to be vertically stacked as they pass through each respective through hole and ensures that the cables do not slide or move in the horizontal direction. This also maintains proper looping of the cables 20 around the bracket 18 between the front compartment 72 and the rear compartment 74. The bracket 18 includes various terminals 78 that would be electrically connected to terminals 58 on the grounding bracket 50 via wires or other electrical connections.

Pedestal 10 may additionally include one or more sensor to sense or gather data pertaining to the surrounding environment or operation of the pedestal 10. Some exemplary sensors capable of being electronically coupled with the pedestal 10 (either directly connected to the pedestal 10 or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The pedestal 10 may include wireless communication logic coupled to sensors on the pedestal 10. The sensors gather data and provide the data to the wireless communication logic. Then, the wireless communication logic may transmit the data gathered from the sensors to a remote device. Thus, the wireless communication logic may be part of a broader communication system, in which one or several pedestal 10 may be networked together to report alerts and, more generally, to be accessed and controlled remotely. Depending on the types of transceivers installed in the pedestal 10, the system may use a variety of protocols (e.g., Wifi, ZigBee, MiWi, Bluetooth) for communication. In one example, each of the pedestal 10 may have its own IP address and may communicate directly with a router or gateway. This would typically be the case if the communication protocol is WiFi.

In another example, a point-to-point communication protocol like MiWi or ZigBee is used. One or more of the pedestals 10 may serve as a repeater, or the pedestals 10 may be connected together in a mesh network to relay signals from one pedestal 10 to the next. However, the individual pedestal 10 in this scheme typically would not have IP addresses of their own. Instead, one or more of the pedestals 10 communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the pedestal 10 may differ from embodiment to embodiment. In one embodiment, alerts and signals from the pedestal 10 are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department or utility operator of pedestal 10. Thus, if a particular pedestal 10 creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the pedestal 10 may also be sent to a work tracking system that allows the individual, or the organization for which he or she works, to track the status of the various alerts that are received, to schedule particular workers to repair a particular pedestal 10, and to track the status of those repair jobs. A work tracking system would typically be a server, such as a Web server, which provides an interface individuals and organizations can use, typically through the communication network. In addition to its work tracking functions, the work tracker may allow broader data logging and analysis functions. For example, operational data may be calculated from the data collected by the sensors on the pedestal 10 and the system may be able to provide aggregate operational data for a pedestal 10 or group of pedestals 10. Then, when a service line operator is sent to maintain the pedestal 10, that operator could connect their locator device with the exterior terminal 62 to determine which cables 20 are within pedestal 10 without having to disassemble the pedestal 10. As such, the presence of exterior terminal 62 assists with configuration and diagnostic purposes of pedestal 10.

As described herein, aspects of the present disclosure may include one or more electrical or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A data transmission pedestal assembly comprising:
a cover including at least one sidewall that defines a portion of an interior space for retaining cables therein;
a base configured to connect with the cover, the base including at least one sidewall;
a cable mounting bracket located within the interior space of the cover;
a grounding bracket located within the interior space, wherein at least one cable is mounted on the cable mounting bracket and the at least one cable is electrically coupled to the grounding bracket; and
an exterior active signal terminal in electrical communication with the grounding bracket via a wire extending from the exterior active signal terminal to the grounding bracket within the interior space, wherein the exterior active signal terminal and wire transmit a signal therethrough in response to the signal being generated by a cable locator device and connected with the exterior active signal terminal, wherein the cable locator device is adapted to determine which cables are contained within the interior space of the data transmission pedestal assembly based on the generated signal while the data transmission pedestal assembly remains assembled with the cover connected to the base.

2. The data transmission pedestal assembly of claim 1, further comprising:
a parting line established at a union of the cover with the base, wherein the exterior active signal terminal is located below the parting line.

3. The data transmission pedestal assembly of claim 1, further comprising:
a frontal wall of the base, wherein the exterior active signal terminal is located on the frontal wall of the base.

4. The data transmission pedestal assembly of claim 3, further comprising:
a ground indicator line on the frontal wall of the base, wherein the exterior active signal terminal is located on the frontal wall of the base above the ground indicator line.

5. The data transmission pedestal assembly of claim 1, further comprising:
a frontal wall of the base, wherein the frontal wall defines an aperture to pass cables through the aperture into the interior space.

6. The data transmission pedestal assembly of claim 5, further comprising:
a gasket in the aperture defined in the frontal wall of the base.

7. The data transmission pedestal assembly of claim 6, further comprising:
a vertical slit in the gasket to permit passage through the gasket.

8. The data transmission pedestal assembly of claim 7, further comprising:
a horizontal slit in the gasket that extends from the vertical slit.

9. A data transmission pedestal assembly comprising:
a cover including at least one sidewall that defines a portion of an interior space for retaining cables therein;
a base configured to connect with the cover, the base including at least one sidewall;
a cable mounting bracket located within the interior space of the cover;
a grounding bracket located within the interior space, wherein at least one of the cables coupled to the grounding bracket;
an exterior terminal in communication with the grounding bracket, wherein the exterior terminal is adapted to connect with a cable locator device that determines which cables are contained within the interior space of the data transmission pedestal assembly while the data transmission pedestal assembly remains assembled with the cover connected to the base;
a vertical center axis;
wherein the cable mounting bracket defines the interior space into a front compartment and a rear compartment; and
at least one through hole formed in the cable mounting bracket to permit passage of the cable between the front compartment and the rear compartment, wherein the at least one through hole is offset from the vertical center axis.

10. The data transmission pedestal assembly of claim 9, further comprising:
four through holes formed in the cable mounting bracket, wherein the at least one through hole is one of the four through holes.

11. The data transmission pedestal assembly of claim 10, wherein the four through holes comprises:
a first through hole;
a second through hole;
a third through hole; and
a fourth through hole;
wherein the first and second through holes are located above the third and fourth through holes.

12. The data transmission pedestal assembly of claim 11, further comprising:
an upper first loop support located along the vertical center axis between the first and second through holes;
a lower second loop support located along the vertical center axis between the third and fourth through holes.

13. The data transmission pedestal assembly of claim 9, further comprising:
a rectangular configuration of the at least one through hole, wherein a vertical length dimension of the at least one through hole is greater than a horizontal width dimension of the at least one through hole.

14. The data transmission pedestal assembly of claim 1, further comprising:

a frontal wall of the cover; and a first handle on the frontal wall of the cover.

15. The data transmission pedestal assembly of claim 14, wherein the first handle is integrally formed in the frontal wall of the cover adjacent a top surface of the cover.

16. The data transmission pedestal assembly of claim 14, further comprising:

a rear wall of the cover; and a second handle on the rear wall of the cover.

17. The data transmission pedestal assembly of claim 16, wherein the second handle is integrally formed in the rear wall of the cover adjacent a top surface of the cover.

18. A method of use for a data transmission pedestal assembly comprising:

approaching a data transmission pedestal assembly comprising:

a cover including at least one sidewall that defines a portion of an interior space for retaining cables therein;

a base connected with the cover, the base including at least one sidewall;

a cable mounting bracket located within the interior space of the cover;

a grounding bracket within the interior space, wherein at least one cable is coupled to the grounding bracket; and an exterior active signal terminal in communication with the grounding bracket via a wire extending from the exterior active signal terminal to the grounding bracket within the interior space;

connecting a cable locator device to the exterior active signal terminal while the data transmission pedestal assembly remains assembled with the cover connected to the base;

transmitting a signal generated from the cable locator device through the exterior active signal terminal and the wire locating, with the cable locator based on the generated signal, a cable within the assembled pedestal assembly while the data transmission pedestal assembly remains assembled with the cover connected to the base.

19. A method of use for a data transmission pedestal assembly comprising:

approaching a data transmission pedestal assembly comprising:

a cover including at least one sidewall that defines a portion of an interior space for retaining cables therein;

a base connected with the cover, the base including at least one sidewall;

a cable mounting bracket located within the interior space of the cover;

a grounding bracket within the interior space, wherein at least cable is coupled to the grounding bracket; and an exterior terminal in communication with the grounding bracket;

connecting a cable locator device to the exterior terminal while the data transmission pedestal assembly remains assembled with the cover connected to the base;

locating, with the cable locator, a cable within the assembled pedestal assembly while the data transmission pedestal assembly remains assembled with the cover connected to the base; and locating at least one cable that extends through a rectangular through hole in the cable mounting bracket, wherein the rectangular through hole is offset from a vertical center axis and has a vertical length dimension that is greater than a horizontal width dimension.

20. The method of claim 18, further comprising:

removing the cover from the base after having located the cable, wherein removing the cover from the base is accomplished by lifting the cover with a handle integrally formed in the at least one sidewall of the cover.

* * * * *